United States Patent Office 3,196,143
Patented July 20, 1965

---

3,196,143
PRODUCTION OF TRANS-1,4 POLYBUTADIENE WITH A REDUCIBLE TITANIUM COMPOUND-ORGANOALUMINUM - THIOETHER CATALYST
Raymond A. Stewart and Evalds Lasis, Sarnia, Ontario, Canada, assignors to Polymer Corporation Limited, Sarnia, Ontario, Canada, a body corporate and politic
No Drawing. Filed Dec. 5, 1960, Ser. No. 73,481
Claims priority, application Canada, Dec. 26, 1959, 789,266
13 Claims. (Cl. 260—94.3)

This invention relates generally to the polymerization of diolefins using a novel catalyst and to the polymer so produced. In its narrower aspects, it relates to the polymerization of butadiene to produce a product which is high in the trans-1,4-configuration.

It is well known that the configuration of polymeric chains prepared from conjugated diolefins has a major effect on the physical properties. For example, Hevea rubber, which has a cis-1,4 configuration of isoprene units, possesses the properties which are usually desired for applications such as tires. On the other hand, balata has a trans-1,4 configuration of isoprene units and is a hard plastic type polymer which is unsuitable for use in tires but is highly desirable for special uses such as in the manufacture of golf ball covers.

Recent work in the polymerization field has shown that various olefins including butadiene and isoprene can be polymerized at relatively low temperatures and pressures to high molecular weight polymers using a process involving a catalyst mixture of an organo-metallic reducing agent and reducible compounds of heavy metals. The catalysts in this system include metal alkyls, metal hydrides, or metal alkyl hydrides in combination with halides, oxyhalides, alkoholates, esters and the like of heavy metals such as titanium. In the polymerization of conjugated diolefins a particular catalyst combination may result in a product in which a particular configuration predominates. For example, butadiene-1,3 can be polymerized using a catalyst complex formed by admixing vanadium trichloride and aluminum triisobutyl to produce a polymer having a high percentage of trans-1,4 units. However, the product is insoluble and has a high melting point, generally 140° C. or higher. The insolubility and high melting point of this polymer prevents its acceptance in commerce. On the other hand, when butadiene is polymerized in the presence of a catalyst complex formed by admixing titanium tetraiodide and an aluminum alkyl such as aluminum triisobutyl, the product is made up mostly of cis-1,4 units. The specificity of these polymerization systems is further illustrated by the fact that isoprene does not polymerize to a significant degree in the presence of the titanium tetraiodide-aluminum triisobutyl.

It is an object of the present invention to provide a process for polymerizing conjugated diolefins using a novel polymerization catalyst.

A further object is to provide a polymer of a conjugated diolefinic hydrocarbon, having 4 carbon atoms in the unsaturated chain, in which at least 80% of the units in the trans-1,4 configuration and, in one of its more particular aspects, to produce a novel polymer of butadiene in which more than 90% of the units are in the trans-1,4 configuration.

The term "butadiene" whenever used throughout the specification and claims refers to butadiene-1,3 and is not intended to include butadiene-1,2 or derivatives of butadiene-1,3 such as chlorobutadiene. However, the invention applies generally to conjugated diolefinic hydrocarbons having 4 carbon atoms in the unsaturated chain. For example, isoprene may also be polymerized to a polymer having a high trans-1,4 content.

The inventors have made the surprising discovery that when certain catalysts which polymerize diolefins predominantly in the cis-1,4 configuration are modified by the addition of thioethers, they produce polymers which are predominantly in the trans-1,4 configuration. They have discovered that conjugated diolefinic hydrocarbons having 4 carbon atoms in the unsaturated chain, and especially butadiene can be polymerized to produce a polymer in which at least 80% and even more than 90% of the units are in the trans-1,4 configuration by carrying out the polymerization in the presence of a catalyst formed by admixing (1) a reducible compound of a heavy metal of Group IVB of the Periodic Table, (2) certain organo-metallic compounds of a metal of Group IIIA of the Periodic Table, and (3) a thioether, in which at least one of compounds (1) and (2) contains iodine.

The objects of the invention are achieved by the process of producing a polymer, having at least 80% of its units in the trans-1,4 configuration, from a conjugated diolefinic hydrocarbon having 4 carbon atoms in the unsaturated chain which comprises polymerizing said conjugated diolefinic hydrocarbon in the presence of an iodine-containing catalyst comprising an admixture of (1) a reducible compound of a heavy metal of Group IVB of the Periodic Table, (2) an organo-metallic compound having the formula $MeR_1R_2R_3$ in which Me is a metal selected from Group IIIA of the Periodic Table, $R_1$ and $R_2$ are hydrocarbon radicals and $R_3$ is selected from the group consisting of hydrogen, halogen, hydrocarbon radicals and oxyhydrocarbon radicals, and (3) a thioether, in which at least one of compounds (1) and (2) contains iodine.

In its narrower aspects the object of the invention is achieved by the process of producing a polymer of butadiene-1,3 in which at least 80% of the units are in the trans-1,4 configuration which comprises polymerizing butadiene-1,3 in the presence of an iodine-containing catalyst comprising an admixture of (1) a reducible titanium compound, (2) an organo-aluminum compound having the formula $AlR_1R_2R_3$ in which $R_1$ and $R_2$ are alkyl hydrocarbon radicals having 2 to 6 carbon atoms and $R_3$ is selected from the group consisting of halogen, hydrogen, alkyl hydrocarbon and oxyhydrocarbon radicals in which said alkyd hydrocarbon and oxyhydrocarbon radicals each contain 2 to 6 carbon atoms, and (3) an alkyl thioether in which each alkyl radical contains 1 to 4 carbon atoms, in which at least one of said compounds (1) and (2) contains iodine, the ratio of organo-aluminum compound to reducible titanium compound being between 1:1 and 10:1 on a molar basis and the amount of said thioether being between about 0.5 and 10 moles per mole of said organo aluminum compound.

The Periodic Table referred to is that shown on page 342, Handbook of Chemistry and Physics, 33rd Edition, published by the Chemical Rubber Publishing Company, Cleveland, Ohio, 1951.

The reducible compounds of the heavy metals of Group IVB of the Periodic Table which may be used in the catalyst system are preferably those in which the metal has a valency of 4. Heavy metals are herein considered to be those having an atomic number of 22 or higher and include titanium, zirconium, hafnium and thorium of which titanium is preferred. The compounds may be represented by the general formula $MX_nR_{4-n}$ in which M is a heavy metal of Group IVB of the Periodic Table, X is halogen, R is a hydrocarbon radical, an oxyhydrocarbon radical or an organic salt-forming radical, and $n$ is an integer having a value of 1 to 4. The hydrocarbon radicals may be alkyl, aryl, alkylaryl or cycloalkyl hydrocarbon radicals and the most useful are those having fewer than about 12 carbon atoms whereas those having from 1 to 6 carbon atoms are preferred. X may be any of fluorine, chlorine, bromine and iodine. It is to be understood that mixtures of halogen atoms as well as mixed hydrocarbon and oxyhydrocarbon radicals may be used. Examples of the compounds which may be used include $TiF_4$, $TiCl_4$, $TiI_4$, $TiBr_4$, $TiCl_3I$, $TiCl_3Br$, $TiCl_3F$, $TiCl_2I_2$, $TiCl_2Br_2$, $TiCl_2F_2$, $TiClI_3$, $TiClBr_3$, $TiI_3Br$, $TiI_2Br_2$ and $TiIBr_3$ as well as $TiCl_3(C_2H_5)$, $TiCl_2(C_2H_5)_2$, $TiCl(C_2H_5)_3$, $TiCl_2I(C_2H_5)$, $TiClI_2(C_2H_5)$ as well as the other possible combinations of halogen atoms with the same and other alkyl radicals. Examples of compounds which are salts of organic acids which may be used include titanium tetracetate, titanium tetrapropionate, titanium tetrabutyrate, titanium tetrahexoate, titanium trichloromonoacetate, titanium monochlorotriacetate, titanium monochloromoniododiacetate and the like. The compounds containing oxyhydrocarbon radicals which can be used include $TiCl_3(OC_2H_5)$ trichloromonoethyl titanate, $TiCl_2(OC_4H_9)_2$ dichlorodibutyl titanate, $TiCl(OC_4H_9)_3$ monochlorotributyl titanate, $Ti(OC_4H_9)_4$ tetra-n-butyl titanate, $TiCl_2I(OC_4H_9)$ dichloromonoiodomonobutyl titanate, $Ti(OC_6H_5)_4$ tetraphenyl titanate, as well as various other combinations of halogens and oxyhydrocarbons. The hydrocarbon portion of oxyhydrocarbon radicals may be alkyl, aryl, alkylaryl or cycloalkyl hydrocarbons and those having fewer than about 12 carbon atoms are the most useful with the preferred hydrocarbons being those having 1 to 6 carbon atoms. For simplicity, the reducible compounds set out above have all been titanium compounds but it is to be understood that the other heavy metals of Group IVB as defined above may be used in place of titanium.

The organo-metallic compounds which may be used are compounds of metals of Group IIIA in which carbon atoms of at least two hydrocarbon groups are attached directly to the metal. These compounds may be represented by the general formula $MeR_1R_2R_3$ in which Me is a metal of Group IIIA, $R_1$ and $R_2$ are alkyl, aryl, alkylaryl or cycloalkyl hydrocarbon radicals, and $R_3$ is hydrogen, halogen or an alkyl, aryl, alkylaryl, cycloalkyl hydrocarbon or oxyhydrocarbon radical. Examples of such compounds are aluminum trimethyl, aluminum triethyl, aluminum triisobutyl, aluminum trihexadecyl, monomethyl aluminum diethyl, monoethyl aluminum dimethyl, monoethyl aluminum dihexadecyl, monohexadecyl aluminum diisobutyl, aluminum triphenyl, aluminum diethyl monohydride, aluminum diethyl ethoxide, aluminum diisobutyl isobutoxide, aluminum diethyl chloride, aluminum diisobutyl iodide and various other combinations of the metals of Group IIIA with similar and other halogen, hydrocarbon or oxyhydrocarbon groups provided that at least two of the substituents are hydrocarbon radicals. Although aluminum is the preferred metal, it may be replaced by gallium, indium or thallium in the practice of the invention. The size of the hydrocarbon radicals which are attached to the metal and of the hydrocarbon portion of the oxyhydrocarbon radicals is not critical although it is generally desirable to use those having about 1 to 12 carbons and it is preferred to use alkyl hydrocarbon radicals having 2 to 6 carbon atoms.

In the practice of the present invention, it is essential that the catalyst contain bound iodine. The iodine may be present in either the reducible compound of the heavy meal of Group IVB or the organo-metallic compound of the metal of Group IIIA. If desired both of these compounds may contain bound iodine. Examples of the catalyst combinations which may be used include: $TiCl_4$ and $Al(C_2H_5)_2I$; $TiCl_3I$ and $Al(C_2H_5)_3$; $Ti(OC_4H_9)_4$ and $Al(C_2H_5)_2I$; $TiCl(OC_4H_9)_3$ and $Al(C_2H_5)_2I$; $TiCl_2I(C_2H_5)$ and $Al(C_2H_5)_3$; $TiBr_2I_2$ and $Al(C_4H_9)_3$; $TiCl_3I$ and $Al(C_2H_5)_2H$; $TiCl_3I$ and $Al(C_4H_9)_2(OC_2H_5)$; $TiI_4$ and $Al(C_2H_5)_3$; $TiI_4$ and $Al(C_2H_5)_2Cl$; $TiCl_2I_2$ and $Al(C_4H_9)_2Cl$; $TiCl_2I_2$ and $Al(C_4H_9)_2Br$ and the various other combinations which fall within the definition given above.

The thioether is also an essential component of the catalyst system for the practice of the present invention. Those which are most effective may be represented by the formula $R_4$—S—$R_5$ in which $R_4$ is an alkyl hydrocarbon radical and $R_5$ is selected from the group consisting of alkyl, aryl, alkylaryl and cycloalkyl hydrocarbon radicals. These include simple, or symmetrical, saturated aliphatic thioethers represented by the general formula $C_nH_{2n+1}.S.C_nH_{2n+1}$ in which $n$ is a whole number, such as dimethyl sulphide, diethyl sulphide, di-n-propyl sulphide, diisopropyl sulphide, di-n-butyl sulphide, dioctyl sulphide, and the like, and unsymmetrical aliphatic thioethers represented by the general formula

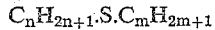

$$C_nH_{2n+1}.S.C_mH_{2m+1}$$

in which $m$ and $n$ are different whole numbers, such as methylethyl sulphide, isopropylethyl sulphide, isopropylmethyl sulphide, isopropylbutyl sulphide as well as various combinations of other alkyl groups. There is no theoretical limit to the number of carbon atoms in each alkyl group although the most useful are those having from 1 to 4 carbon atoms. It is also possible to use unsaturated aliphatic thioethers such as vinyl thioether. Other compounds which may be used include aromatic thioethers containing one aromatic substituent, typical examples of which are phenylmethyl sulphide, phenylethyl sulphide and the like. It should of course be understood that it is possible to use mixtures of any of the above thioethers. The preferred thioether is diethyl sulphide.

The catalyst complex may be prepared in a variety of ways. Since thioethers react with organo-metallic compounds to form thioetherates, it is possible in the production of the complex to mix the heavy metal compound, the organo-metallic compound and the thioether in any order desired. For example, the thioether may be added to the reactor before the other reactants; it may be added to either the heavy metal compound or the organo-metallic compound before these two components are mixed; it may be added to a mixture of the heavy metal compound and the organo-metallic compound before they are contacted with the monomer; or it may even be added to the polymerization vessel during the polymerization reaction. The iodine may be incorporated in the catalyst in a variety of ways. It may be bound in either or both of the heavy metal compound or the organo-metallic compound, or it may be incorporated by reaction with a compound capable of releasing reactive iodine. Such compounds include molecular iodine ($I_2$), hydrogen iodide (HI), iodine monochloride and iodine monobromide as well as numerous other compounds capable of releasing reactive iodine. This compound may be admixed with the heavy metal compound and the admixture mixed with the organo-metallic compound. It may be admixed with the organo-metallic compound and the admixture then mixed with the heavy metal compound. Or a mixture may be formed of the two metal compounds and the iodine compound added thereto. Usually a short ageing period is required for iodine to react with the other compounds and those skilled in the art may readily determine the conditions necessary for such reaction. The amount of iodine reacted in this way is desirable about one mole per mole of organo-metallic compound although the amount may vary from about 0.5 to 1.5 moles per mole of organo-metallic compound.

The amount of thioether which is used is conveniently expressed in relation to the amount of the organo-metallic compound. The amount may vary widely but generally falls between about 0.75 and about 10 moles per mole of the organo-metallic compound. The optimum amount depends on the polymerization conditions and can be determined readily by those skilled in the art. For example, when the polymerization is carried out at temperatures of 0–30° C., the optimum ratio is between 0.75 and 1.5 but when the polymerization temperature is about 55° C., the optimum ratio is higher and even a ratio of 10 can be used in the production of a high trans-1,4 product in high yield.

The total amount of catalyst which is required to effect polymerization may be determined readily by those skilled in the art and depends on the particular conditions, such as temperature, impurities, etc. The mole ratio of the organo-metallic compound to the heavy metal compound in the catalyst combination may vary over a range from about 1/1 to about 10/1, although it is preferred for best results in the practice of the invention to use a mole ratio between about 4/1 and 8/1. The yield of polymer is reduced when the ratio is too low and it is uneconomic to use more of the organo-metallic compound than is necessary. The actual optimum ratio under various operating conditions may be readily determined.

The polymerization may be carried out over a wide range of temperatures, although it is generally undesirable to operate above about 100° C. There is likewise, no critical low temperature and the polymerization may be carried out at a temperature as low as −75° C. or lower. The reaction rate is rather low at the lower temperatures and the preferred operating range is between about 0° C. and +70° C. The reaction is most conveniently carried out while the reactants are dispersed in a non-reactive liquid medium such as pentane, hexane, heptane, cyclohexane, benzene, toluene, xylene or any other relatively low boiling non-reactive solvent which can be readily removed from the reaction product. The preferred diluents are aliphatic liquids since these result in a product which is higher in trans-1,4 content than do the aromatic liquids. The amount of the diluent is not critical but should generally be such that the viscosity of the reactor contents is low enough to permit thorough mixing and adequate temperature control. However, the presence of a non-reactive diluent is not essential in the practice of the invention and the diolefin being polymerized may itself form the diluent.

The invention will be described in greater detail by means of examples. Titanium compounds were added as a solution in n-heptane containing one gram per 100 mls. of solvent. The organo-metallic compound was added as a 1 molar solution in n-heptane. The balance of the diluent was n-pentane or n-heptane which had been previously dried over calcium hydride. Some of the examples show a control run in which no thioether was present. Such runs do not form a part of the present invention but are included to illustrate the need for the thioether in the practice of the present invention.

Melting points of some of the polymers were determined by heating small particles of the polymer in powder form on an electrically heated hot plate. The temperature of the plate was indicated on a thermometer inserted into a thermowell and was varied by varying the voltage to the heating element. The particles of polymer were placed on a microscope cover plate on the hot plate and the temperature raised gradually. By manipulation of the particles with a spatula, the temperature was observed at which the material became tacky and the particles tended to fuse and adhere to the glass. A second microscope cover plate was then placed over the sample and the temperature rise continued. The melting point was determined by pressing gently on the top glass and observing the temperature at which the specimen particles softened sufficiently to flow. This temperature is herein termed the melting point and the values recorded herein are the average of either two or three separate determinations.

Structural analysis of the polymers was determined by means of an infra-red spectrophotometer. The analyses are based on the assumption that the polymers contain one unsaturated bond for each monomer unit, and they are reported as trans-1,4 and 1,2 content on the understanding that the balance of the polymer is in the cis configuration.

EXAMPLE I

Butadiene was polymerized in standard seven ounce crown capped polymerization bottles which had been thoroughly dried, flushed with nitrogen, and charged according to the following recipe:

Total diluent _____ 103.6 mls.
Butadiene _____ 50.0 mls.
Aluminum triisobutyl _____ $3.6 \times 10^{-3}$ moles.
Dimethyl sulphide _____ Variable.
Titanium tetraiodide _____ $0.72 \times 10^{-3}$ moles.

The ingredients were charged in the order shown in the recipe. After the addition of dimethyl sulphide, the contents of the bottles were aged for 30 to 60 minutes at room temperature before the titanium tetraiodide was added. The bottles were maintained at 12.8° C. for 18 hours after which the reaction was stopped by the injection of an excess of ethanol. The product in each bottle was transferred to a separate flask and heated to 35 to 50° C. for a period of one hour to evaporate the diluent. The polymer which remained was then extracted with boiling ethanol, containing one percent by weight of phenyl beta naphthylamine, to destroy residual catalyst, and dried under vacuum at 50° C. for 16 hours. The results are shown in Table I.

*Table I*

| Bottle No. | Mole Ratio Thioether/Al $(iC_4H_9)_3$ | Conversion (Percent) | Trans-1,4 Content (Percent) | 1,2 Content (Percent) |
|---|---|---|---|---|
| 1 | 0 | 62.6 | 23.5 | 11.0 |
| 2 | 0.75 | 50.9 | 83.0 | 6.7 |
| 3 | 0.9 | 36.5 | 82.0 | 6.8 |
| 4 | 1.0 | 60.4 | 93.2 | 3.9 |
| 5 | 1.5 | 4.6 | 91.7 | 7.2 |
| 6 | 2.0 | 3.2 | | |

The polymers were essentially completely soluble in toluene at room temperature. These results show that when butadiene-1,3 is polymerized in the presence of an organo-aluminum thioetherate titanium tetraiodide complex catalyst, the product is predominantly trans-1,4 material. They show that when there is one thioether group present for each mole of aluminum triisobutyl more than 90 percent of the product has the trans-1,4 configuration. Even when the ratio of thioether to aluminum triisobutyl is only 0.75, the polymer is comprised of more than 80 percent trans-1,4 material. There was insufficient product from bottle No. 6 to permit structural analysis. The melting point of the product from bottle No. 4 was found to be 56.0° C.

EXAMPLE 2

Butadiene was polymerized in the same recipe as used in Example 1 except that the dimethyl sulphide was replaced by diethyl sulphide. Polymerization was carried out and the polymer recovered and tested as in Example 1, the results being shown in Table II.

*Table II*

| Bottle No. | Mole Ratio Thioether/Al $(iC_4H_9)_3$ | Conversion (Percent) | Trans-1,4 Content (Percent) | 1,2 Content (Percent) |
|---|---|---|---|---|
| 1 | 0 | 53.2 | 18 | 9 |
| 2 | 0.32 | 74.2 | 18 | 9 |
| 3 | 0.5 | 77.4 | 44 | 4.6 |
| 4 | 0.9 | 74.2 | 84.6 | 3.4 |
| 5 | 1.0 | 71.0 | 86 | 2.6 |
| 6 | 1.2 | 74.2 | 95.0 | 2.5 |
| 7 | 1.5 | 51.6 | 96.8 | 2.6 |
| 8 | 1.5 | 71.0 | 98.0 | 2.0 |
| 9 | 1.8 | 38.7 | 97.6 | 2.4 |

All of the polymers were essentially completely soluble in toluene at room temperature. These data show that the thioetherate containing the diethyl sulphide group gives somewhat better results than that containing the dimethyl sulphide group since both the conversion and trans-1,4 content of the product are higher than those shown in Example 1. The melting points of the polymer from bottles Nos. 4–8 inclusive were determined and found to be 55, 41, 55, 57.3 and 61 degrees centigrade respectively.

EXAMPLE 3

Butadiene was polymerized, recovered and tested as in Example 1 except that the dimethyl sulphide in the polymerization recipt was replaced by di-n-butyl sulphide. The results are shown in Table III.

*Table III*

| Bottle No. | Mole Ratio Thioether/Al $(iC_4H_9)_3$ | Conversion (Percent) | Trans-1,4 Content (Percent) | 1,2 Content (Percent) |
|---|---|---|---|---|
| 1 | 0 | 84.8 | 10.0 | 6 |
| 2 | 0.5 | 45.8 | 10.0 | 8 |
| 3 | 0.8 | 69.4 | 57.0 | 5 |
| 4 | 1.25 | 58.1 | 85.6 | 3.1 |

EXAMPLE 4

Butadiene was polymerized in bottles prepared as in Example 1 using the following recipe:

Total diluent _____ 146 mls.
Titanium tetraiodide _____ 0.90×10⁻³ moles.
Aluminum triisobutyl _____ 6.0×10⁻³ moles.
Dioctyl sulphide _____ Variable.
Butadiene _____ 30.0 mls.

The polymerization ingredients were charged in the order shown in the recipe and after the addition of dioctyl sulphide the contents of the bottle were aged for 30 minutes at room temperature before the addition of the butadiene. Polymerization was allowed to proceed at 30° C. for 18 hours after which the reaction was stopped and the polymer recovered and tested as in Example 1. The results are shown in Table IV.

*Table IV*

| Bottle No. | Mole Ratio Thioether/Al $(iC_4H_9)_3$ | Conversion (Percent) | Trans-1,4 Content (Percent) | 1,2 Content (Percent) |
|---|---|---|---|---|
| 1 | 0.4 | 16 | 19 | 21 |
| 2 | 0.7 | 35 | 22 | 13 |
| 3 | 1.0 | 31 | 33 | 14 |
| 4 | 1.5 | 30 | 90 | 5 |

The data of Example 4 show that the thioetherate may be formed by adding the thioether after the titanium tetraiodide and aluminum triisobutyl have been mixed. This example as well as Example 3 when compared with Examples 1 and 2 shows that more dioctyl sulphide and di-n-butyl sulphide is required to produce a high trans-1,4 polymer at 30° C. than is required in the case of dimethyl and diethyl sulphide at 12.8° C.

EXAMPLE 5

Butadiene was polymerized in bottles prepared as in Example 1 using the following recipe in which the ingredients are listed in the order charged:

Total diluent _____ 103 mls.
Butadiene _____ 30.0 mls.
Aluminum triisobutyl _____ 3.0×10⁻³ moles.
Diethyl sulphide _____ Variable.
Titanium tetraiodide _____ 0.60×10⁻³ moles.

After the addition of the diethyl sulphide, the contents of the bottles were aged for 30 minutes at room temperature before the addition of the titanium tetraiodide. Polymerization was allowed to proceed for 20 hours at 55° C., after which the reaction was stopped and the polymer recovered and tested as in Example 1. The results are shown in Table V.

*Table V*

| Bottle No. | Mole Ratio Thioether/Al$(iC_4H_9)_3$ | Conversion, (Percent) | Solubility in Toluene (Percent) | Trans-1,4 Content (Percent) | 1,2 Content (Percent) |
|---|---|---|---|---|---|
| 1 | 1.0 | 95 | 92.6 | 75.0 | 6 |
| 2 | 1.5 | 95 | 98.3 | 75.6 | 4.6 |
| 3 | 2.0 | 92 | 97.4 | 86.0 | 4.4 |
| 4 | 3.0 | 97 | 94.8 | 90.4 | 4.3 |
| 5 | 6.0 | 80 | 97.8 | 95.2 | 5.0 |

The melting points of the products from bottles 4 and 5 were found to be 77° C. and 93° C. and all the polymers were completely soluble in toluene at room temperature. The data illustrate that when polymerization is carried out at 55° C., it is preferable to charge a substantial molar excess of diethyl sulphide over aluminum triisobutyl.

EXAMPLE 6

Butadiene was polymerized as in Example 2 except that the amount of diethyl sulphide used in all bottles was 0.75 ml. and the amount of aluminum triisobutyl in the charge was varied. The results are shown in Table VI.

*Table VI*

| Bottle No. | Mole Ratio Al/Ti | Mole Ratio Thioether/Al$(iC_4H_9)_3$ | Conversion (Percent) | Trans-1,4 Content (Percent) | 1,2 Content (Percent) |
|---|---|---|---|---|---|
| 1 | 2.5 | 3.7 | 14.5 | 94.0 | 2.0 |
| 2 | 3.5 | 2.7 | 60 | 97.0 | 2.1 |
| 3 | 5.0 | 1.9 | 89 | 93.3 | 1.7 |
| 4 | 6.5 | 1.4 | 89 | 93.2 | 3.5 |
| 5 | 7.0 | 1.3 | 82 | 86.7 | 2.9 |

EXAMPLE 7

Butadiene was polymerized as in Example 1 except that the polymerization was carried out for 20 hours at 60° C. using the following charge recipe:

Total diluent _____ 106 mls.
Butadiene _____ 30.0 mls.
Aluminum triisobutyl _____ 3.0×10⁻³ moles.
Diethyl sulphide _____ Variable.
Titanium tetraiodide _____ 0.59×10⁻³ moles.

The polymerization was stopped and the polymer recovered and tested as in Example 1. The results are shown in Table VII.

Table VII

| Bottle No. | Mole Ratio Thioether/Al (iC$_4$H$_9$)$_3$ | Conversion (Percent) | Trans-1,4 Content (Percent) | 1,2 Content (Percent) |
|---|---|---|---|---|
| 1 | 1.5 | 95 | 75.6 | 4.6 |
| 2 | 2.2 | 92 | 86 | 4.4 |
| 3 | 6.0 | 80 | 95.0 | 5.0 |

EXAMPLE 8

The procedure of Example 7 was repeated except that di-n-butyl sulphide was used instead of diethyl sulphide. The results are shown in Table VIII.

Table VIII

| Bottle No. | Mole Ratio Thioether/Al (iC$_4$H$_9$)$_3$ | Conversion (Percent) | Trans-1,4 Content (Percent) | 1,2 Content (Percent) |
|---|---|---|---|---|
| 1 | 3.0 | 86 | 78.6 | 6.2 |
| 2 | 4.0 | 62 | 89.5 | 5.3 |
| 3 | 6.0 | 26 | 91.0 | 5.5 |

EXAMPLE 9

Butadiene was polymerized as in Example 2 except that the polymerization was carried out at 30° C. and $5.4 \times 10^{-3}$ moles of aluminum diethyl monoiodide was used instead of aluminum triisobutyl. The ratio of diethyl sulphide to the aluminum compound was 1.9. A conversion of 42 percent was achieved and the product analyzed at 88% trans-1,4 and 3.5% 1,2 material.

EXAMPLE 10

The procedure of Example 9 was repeated except that aluminum diethyl chloride was used instead of aluminum diethyl monoiodide. 47 percent of the butadiene was converted to a polymer which analyzed as 93.2% trans-1,4 and 3.8% 1,2 material.

EXAMPLE 11

Butadiene was polymerized as in Example 2 except that aluminum diisobutyl hydride was used instead of aluminum triisobutyl. The results are shown in Table IX.

Table IX

| Bottle No. | Mole Ratio Thioether/Al (iC$_4$H$_9$)$_2$H | Conversion (Percent) | Trans-1,4 Content (Percent) | 1,2 Content (Percent) |
|---|---|---|---|---|
| 1 | 0.50 | 19 | 82.8 | 2.4 |
| 2 | 0.75 | 27 | 87.9 | 2.5 |
| 3 | 1.5 | 38 | 87.8 | 3.9 |

EXAMPLES 12 AND 13

The procedure of Example 9 was repeated except that $4.8 \times 10^{-3}$ moles of aluminum diethyl monoiodide was used and $0.8 \times 10^{-3}$ moles of titanium tetrachloride was used instead of titanium tetraiodide. In Example 12, 12.0 millimoles and in Example 13, 16.3 millimoles of diethyl sulphide were used. In Example 12, 37% of the butadiene was converted to polymer having 96.8% trans-1,4 and 2.1% 1,2 material. In Example 13, 16% of the butadiene was converted to polymer having 96.4% trans-1,4 and 2.3% 1,2 material.

EXAMPLE 14

Butadiene was polymerized as in previous examples but using the following charge recipe:

Heptane _____ 60 mls.
Pentane _____ 40 mls.
Butadiene _____ 50 mls.
Diethyl Sulphide _____ Variable.
Aluminum diethyl monoiodide _____ $5.0 \times 10^{-3}$ moles.
Titanium dichlorodibutoxide
  (TiCl$_2$(OC$_3$H$_7$)$_2$) _____ $1.0 \times 10^{-3}$ moles.

The ingredients were charged in the order shown in the recipe. After the addition of the aluminum compound, the contents of the bottles were aged for about 30 minutes at 0° C. before the addition of the titanium compound. Polymerization proceeded for 48 hours at 30° C. after which the polymers were recovered and analyzed as in previous examples. The results are shown in Table X.

Table X

| Bottle No. | Mole Ratio Thioether/Al (C$_2$H$_5$)$_2$I | Conversion (Percent) | Trans-1,4 Content (Percent) | 1,2 Content (Percent) |
|---|---|---|---|---|
| 1 | 1.4 | 87 | 83.8 | 2.7 |
| 2 | 2.0 | 83 | 93.2 | 2.4 |
| 3 | 2.5 | 80 | 95.3 | 2.5 |
| 4 | 3.0 | 26 | 94.2 | 2.8 |

EXAMPLE 15

Butadiene was polymerized as in previous examples but using the following charge recipe:

Heptane _____ 55 mls.
Butadiene _____ 50 mls.
Pentane _____ 50 mls.
Diisopropyl sulphide _____ Variable.
Aluminum diethyl monoiodide _____ $15.0 \times 10^{-3}$ moles.
Tetrabutyl titanate (Ti(OC$_4$H$_9$)$_4$) ___ $3.0 \times 10^{-3}$ moles.

The ingredients were charged in the order shown. After the addition of the aluminum compound, the contents of the bottles were aged for 30 minutes at room temperature before addition of the titanium compound. Polymerization proceeded for 40 hours at 30° C. after which the polymers were recovered and analyzed as in previous examples. The results are shown in Table XI.

Table XI

| Bottle No. | Mole Ratio Thioether/Al (C$_2$H$_5$)$_2$I | Conversion (Percent) | Trans-1,4 Content (Percent) | 1,2 Content (Percent) |
|---|---|---|---|---|
| 1 | 0.5 | 89 | 96.6 | 3.4 |
| 2 | 0.8 | 70 | 96.6 | 4.0 |
| 3 | 1.0 | 48 | 93.0 | 3.3 |

Butadiene was polymerized as in previous examples but using titanium dichloro diethyl in the following charge recipe:

Heptane _____ 100.3 mls.
Butadiene _____ 30.0 mls.
Aluminum diethyl monoiodide _____ $4.0 \times 10^{-3}$ moles.
Diethyl sulphide _____ Variable.
TiCl$_2$Et$_2$ (titanium dichloro diethyl) ___ $1.6 \times 10^{-3}$ moles.

The ingredients were charged in the order shown. After the addition of diethyl sulphide the contents of the bottles were aged for 30 minutes at room temperature (approx. 22° C.) before addition of the titanium compound. Polymerization proceeded for 20 hrs. at 30° C. after which the polymers were recovered and analyzed as in previous examples. The results are shown in Table XII.

Table XII

| Bottle No. | Mole Ratio Thioether/Al (C$_2$H$_5$)$_2$I | Conversion (Percent) | Trans-1,4 Content (Percent) | 1,2 Content (Percent) |
|---|---|---|---|---|
| 1 | 0 | 84.0 | 48.0 | 4.0 |
| 2 | 0.8 | 39.2 | 73.2 | 2.8 |
| 3 | 1.1 | 74.1 | 85.8 | 3.1 |
| 4 | 1.3 | 55.8 | 90.4 | 2.9 |
| 5 | 1.8 | 12.5 | 95.6 | 2.8 |

EXAMPLE 16

Butadiene was polymerized as in previous examples but using titanium dichloro diethyl in the following charge recipe:

EXAMPLE 17

Butadiene was polymerized as in previous examples but using titanium dichloro diacetate in the following charge recipe:

| | |
|---|---|
| Heptane | 99.0 mls. |
| Butadiene | 30.0 mls. |
| Aluminum diethyl monoiodide | $7.2 \times 10^{-3}$ moles. |
| Diethyl sulphide | Variable. |
| Titanium dichloro diacetate | $0.9 \times 10^{-3}$ moles. |

The ingredients were charged in the order shown. After the addition of diethyl sulphide, the contents of the bottles were aged for 30 minutes at room temperature before addition of the titanium compound. Polymerization proceeded for 24 hours at 30° C. after which the polymers were recovered and analyzed as in previous examples. The results are shown in Table XIII.

*Table XIII*

| Bottle No. | Mole Ratio Thioether/Al $(C_2H_5)_2I$ | Conversion (Percent) | Trans-1,4 Content (Percent) | 1,2 Content (Percent) |
|---|---|---|---|---|
| 1 | 0.5 | 57.7 | 25.3 | 5.7 |
| 2 | 1.3 | 39.3 | 89.1 | 3.0 |
| 3 | 1.5 | 34.1 | 94.2 | 2.7 |

The invention claimed is:

1. The process of producing polybutadiene in which at least 80% of the units are in the trans-1,4 configuration which comprises polymerizing butadiene at a temperature of 0° C. to 70° C. in the presence of an iodine-containing catalyst comprising an admixture of (1) a titanium compound having the formula $TiX_nR_{4-n}$ in which X is a halogen atom, R contains fewer than 12 carbon atoms and is selected from the group consisting of a hydrocarbon radical, an oxyhydrocarbon radical and an organic salt-forming radical, and $n$ is an integer having a value of 1 to 4, (2) an organo-aluminum compound having the formula $AlR_1R_2R_3$ in which $R_1$ and $R_2$ are hydrocarbon radicals and $R_3$ is selected from the group consisting of hydrogen, halogen, hydrocarbon and oxyhydrocarbon radicals in which said hydrocarbon and oxyhydrocarbon radicals contain from 1 to 12 carbon atoms, and (3) a thioether, in which at least one of said compounds (1) and (2) contain iodine, the ratio of organo-aluminum compound to reducible titanium compound being between 1:1 and 10:1 on a molar basis and the amount of said thioether being between about 0.75 and 10.0 moles per mole of said organo-aluminum compound.

2. The process according to claim 1 in which R contains 1 to 6 carbon atoms.

3. The process according to claim 1 in which the hydrocarbon and oxyhydrocarbon radicals attached to aluminum contain 2 to 6 carbon atoms.

4. The process of producing polybutadiene in which at least 80% of the units are in the trans-1,4 configuration which comprises polymerizing butadiene at a temperature of 0° C. to 70° C. in the presence of an iodine-containing catalyst comprising an admixture of (1) a titanium compound having the formula $TiX_nR_{4-n}$ in which X is a halogen atom, R contains fewer than 12 carbon atoms and is selected from the group consisting of a hydrocarbon radical, and oxyhydrocarbon radical and an organic salt-forming radical, and $n$ is an integer having a value of 1 to 4, (2) an organo-aluminum compound having the formula $AlR_1R_2R_3$ in which $R_1$ and $R_2$ are hydrocarbon radicals and $R_3$ is selected from the group consisting of hydrogen, halogen, hydrocarbon and oxyhydrocarbon radicals in which said hydrocarbon and oxyhydrocarbon radicals contain from 1 to 12 carbon atoms, and (3) a thioether having the formula $R_4$—S—$R_5$ in which $R_4$ is an alkyl hydrocarbon radical and $R_5$ is selected from the group consisting of alkyl, aryl, alkylaryl and cycloalkyl hydrocarbon radicals, in which at least one of said compounds (1) and (2) contain iodine, the ratio of organo-aluminum compound to titanium compound being between 1:1 and 10:1 on a molar basis and the amount of said thioether being between about 0.75 and 10.0 moles per mole of said organo-aluminum compound.

5. The process according to claim 4 in which the thioether is an alkyl thioether in which each alkyl radical contains 1 to 4 carbon atoms.

6. The process according to claim 4 in which R contains 1 to 6 carbon atoms.

7. The process according to 4 in which the hydrocarbon and oxyhydrocarbon radicals attached to aluminum contain 2 to 6 carbon atoms.

8. The process of producing polybutadiene in which at least 80% of the units are in the trans-1,4 configuration which comprises polymerizing butadiene at a temperature of 0° C. to 70° C. while dispersed in a non-reactive liquid medium in the presence of an iodine-containing catalyst comprising an admixture of (1) a titanium compound having the formula $TiX_nR_{4-n}$ in which X is a halogen atom, R contains fewer than 12 carbon atoms and is selected from the group consisting of a hydrocarbon radical, an oxyhydrocarbon radical and an organic salt-forming radical and contains 1 to 6 carbon atoms, and $n$ is an integer having a value of 1 to 4, (2) an organo-aluminum compound having the formula $AlR_1R_2R_3$ in which $R_1$ and $R_2$ are alkyl hydrocarbon radicals having 2 to 6 carbon atoms and $R_3$ is selected from the group consisting of hydrogen, halogen, hydrocarbon and oxyhydrocarbon radicals in which said hydrocarbon and oxyhydrocarbon radicals contain 2 to 6 carbon atoms, and (3) a thioether having the formula $R_4$—S—$R_5$ in which $R_4$ is an alkyl hydrocarbon radical and $R_5$ is selected from the group consisting of alkyl, aryl, alkylaryl and cycloalkyl hydrocarbon radicals, in which at least one of said compounds (1) and (2) contain iodine, the ratio of organo-aluminum compound to titanium compound being between 1:1 and 10:1 on a molar basis and the amount of said thioether being between about 0.75 and 10.0 moles per mole of said organo-aluminum compound.

9. The process according to claim 8 in which said thioether is an alkyl thioether in which each alkyl radical contains 1 to 4 carbon atoms.

10. The process according to claim 9 in which the temperature is 0–30° C. and the amount of said thioether is between about 0.75 and 1.5 moles per mole of said organo-aluminum compound.

11. The process according to claim 9, in which the temperature is about 55° C. and the amount of said thioether is higher than 1.5 moles per mole of said organo-aluminum compound.

12. The process according to claim 10 in which the thioether is diethyl sulphide.

13. The process according to claim 10 in which the thioether is diisopropyl sulphide.

References Cited by the Examiner

UNITED STATES PATENTS

| | | | |
|---|---|---|---|
| 2,843,577 | 7/58 | Friedlander et al. | 260—94.9 |
| 2,959,576 | 11/60 | Payne | 260—94.3 |
| 3,020,269 | 2/62 | Leonard | 260—94.3 |

FOREIGN PATENTS

| | | |
|---|---|---|
| 218,210 | 11/58 | Australia. |
| 551,851 | 4/57 | Belgium. |
| 848,067 | 9/60 | Great Britain. |

JOSEPH L. SCHOFER, *Primary Examiner.*

L. H. GASTON, M. LIEBMAN, *Examiners.*

UNITED STATES PATENT OFFICE
CERTIFICATE OF CORRECTION

Patent No. 3,196,143                                              July 20, 1965

Raymond A. Stewart et al.

It is hereby certified that error appears in the above numbered patent requiring correction and that the said Letters Patent should read as corrected below.

Column 1, line 59, after "units" insert -- are --; column 2, line 43, for "alkyd" read -- alkyl --; column 3, line 5, for "TiCl." read -- $TiCl_4$ --; column 7, line 14, for "recipt" read "recipe --; column 10, line 47, immediately preceding this line and beneath Table XI, as a centered heading, insert "EXAMPLE 16"; column 11, lines 1 to 4, strike out "EXAMPLE 16 Butadiene was polymerized as in previous examples but using titanium dichloro diethyl in the following charge recipe:".

Signed and sealed this 22nd day of February 1966.

(SEAL)
Attest:

ERNEST W. SWIDER                                           EDWARD J. BRENNER
Attesting Officer                                                 Commissioner of Patents